April 21, 1925.                     1,535,002
H. M. WESTHOLZ
RADIUS ROD
Filed March 3, 1924                 2 Sheets-Sheet 1
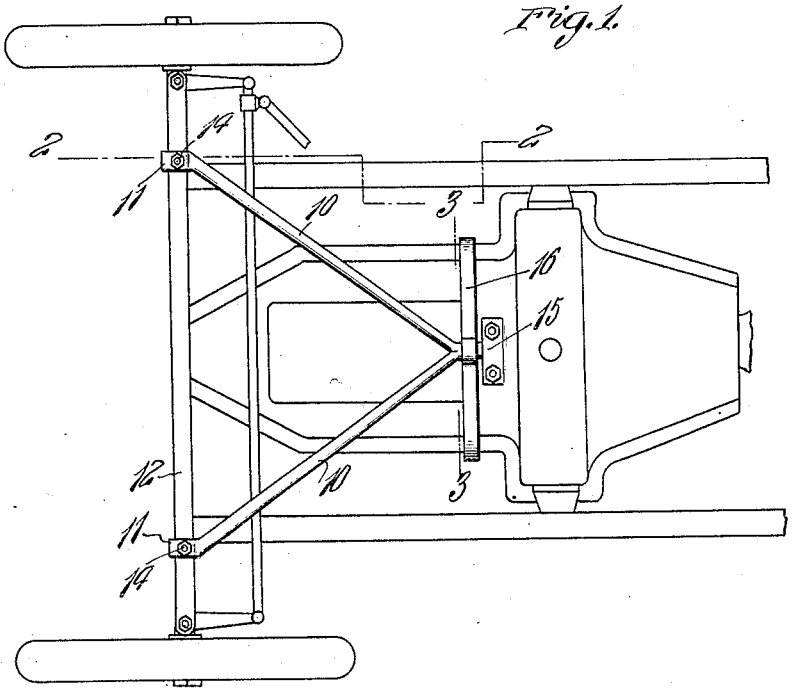
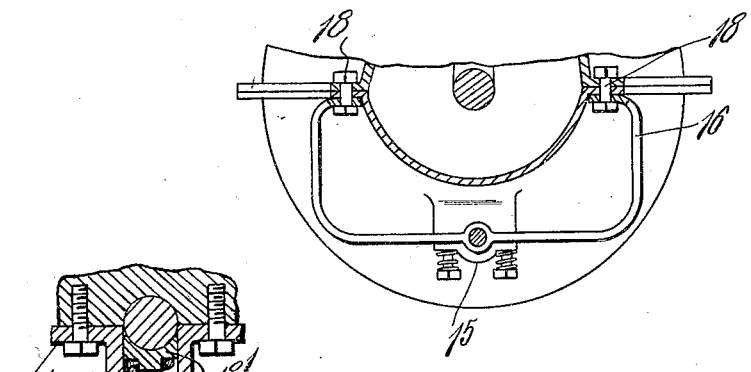
H. M. Westholz
INVENTOR
BY Victor J. Evans
ATTORNEY
WITNESS:

April 21, 1925.
H. M. WESTHOLZ
RADIUS ROD
Filed March 3, 1924
1,535,002
2 Sheets-Sheet 2
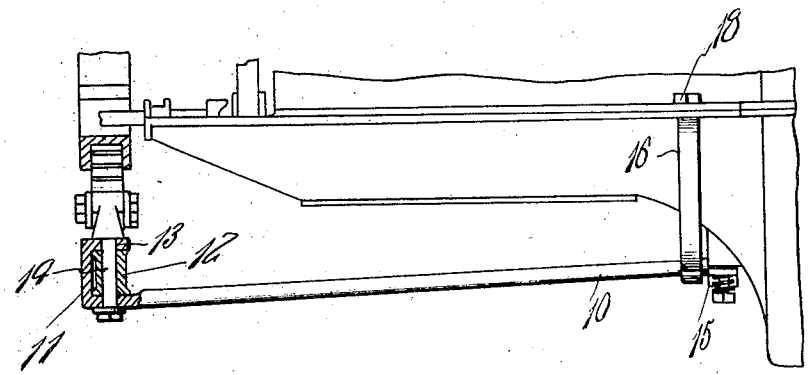
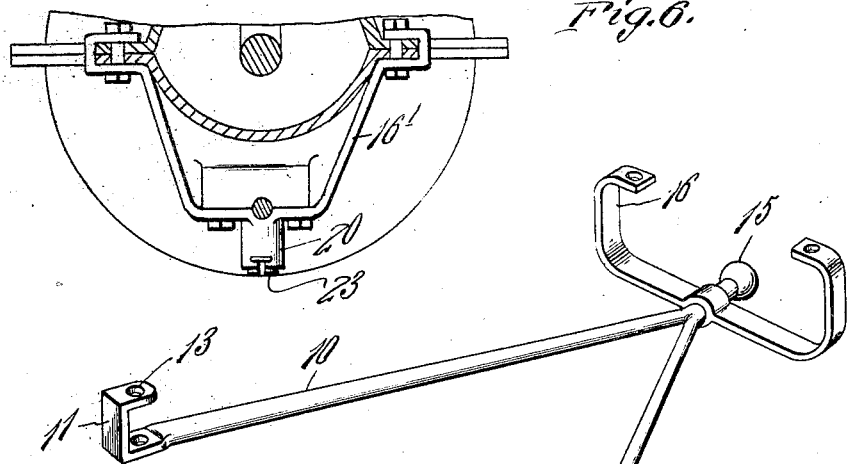
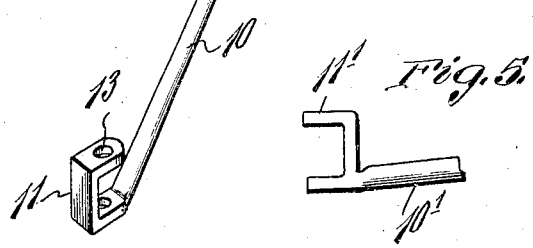
H. M. Westholz
INVENTOR
BY Victor J. Evans
ATTORNEY
WITNESS:

Patented Apr. 21, 1925.

1,535,002

UNITED STATES PATENT OFFICE.

HAROLD M. WESTHOLZ, OF INDEPENDENCE, LOUISIANA.

RADIUS ROD.

Application filed March 3, 1924. Serial No. 696,626.

*To all whom it may concern:*

Be it known that I, HAROLD M. WESTHOLZ, a citizen of the United States, residing at Independence, in the parish of Tangipahoa and State of Louisiana, have invented new and useful Improvements in Radius Rods, of which the following is a specification.

This invention has for its object the provision of a new and improved radius rod primarily intended for use on Ford cars, and designed to be associated therewith in a manner, to diminish the possibility of the rod becoming loose at its connection and thus eliminate rattling.

The nature and advantages of the invention will be better understood when the following detailed description is read in connection with the accompanying drawings, the invention residing in the construction, combination and arrangement of parts as claimed.

In the drawings forming part of this application, like numerals of reference indicate similar parts in the several views, and wherein:

Figure 1 is a view showing the manner in which the radius rod is arranged upon the car, Figure 2 is a sectional view taken on the line 2—2 of Figure 1.

Figure 3 is a sectional view taken on the line 3—3 of Figure 1.

Figure 4 is a perspective view of the radius rod removed from the car.

Figure 5 is a fragmentary view of a modification.

Figure 6 is a sectional view similar to Figure 3 of a modified form.

Figure 7 is a sectional view through the socket and anti-rattling connection.

In accordance with the present invention, the respective branches 10 of the radius rod, which is of the same general outline or configuration as the rod now in use, has its free ends terminating to provide substantially U-shaped portions 11 designed to embrace the front axle 12 of the vehicle. The parallel sides of each U-shaped portion are provided with aligned openings 13 to receive the usual spring perch pin 14, a construction and arrangement which minimizes the possibility of loose connections between the radius rod and axles irrespective of the strain to which the radius rod may be subjected, and incidentally minimize the wear usually resulting to the spring perch incident to loose connections between these parts. The rear end of the rod is connected with the crank casing by the usual ball and socket arrangement 15, in addition to which I employ a transversely disposed yoke 15 of a size to embrace the bottom portion of the crank casing as shown. This yoke 15 terminates to provide inturned extremities 15 which are bolted or otherwise fastened to the crank casing as at 18. This construction will absolutely hold the radius rod ball in place at all times, even should the ball cap be lost or drops from the crankcase which frequently happens and sometimes causes accidents. The invention is very simple in construction and can be positioned upon the car or removed therefrom with a minimum of time and effort.

In Figure 5, I have shown a modified construction of the radius rod and wherein one of the branches is indicated at 10' and terminates to provide a U-shaped portion 11'. This form of the invention differentiates from the preferred form shown in Figure 4 in that the U-shaped portion 11' is arranged to straddle the axle 12 from the rear edge, while in the preferred form, the U-shaped portion passes beneath the axle and embraces the front edge thereof as clearly illustrated in Figure 1.

In Figure 6, I have illustrated another modified form of the invention, wherein the intermediate portion of the yoke 16' is bulged as at 17 to form part of a socket for the reception of the ball 15 hereinabove described. The other part of this socket is indicated at 18', and is arranged within a tubular member 20, which is formed with a flange 21 adapted to be bolted or otherwise suitably secured to the intermediate portion of the yoke 16. The portion 18' of the socket reposes upon a coil spring 22 arranged within the tubular member 20, and which spring yieldably maintains the movable portion of the socket in contact with the ball 15. The tension of this spring can be regulated from time to time as the occasion may require by means of a nut 23 threaded into the lower end of the tubular member 20. This construction not only provides for an effective connection between the radius rod and the crank case of the motor but also serves in the capacity of an anti-rattler device.

While it is believed that from the foregoing description, the nature and advantages of the invention will be readily apparent, I desire to have it understood that I do not limit myself to what is herein shown and described, and that such changes may be resorted to when desired as fall within the scope of what is claimed.

Having thus described the invention, I claim:

1. A radius rod for motor operated vehicles including divergently disposed branches adapted to be connected to the axle of the vehicle, a ball carried by the other end of the radius rod, a socket designed to accommodate the ball and provide a connection between the rod and the crank case, and a yoke carried by the rod adjacent said ball and designed to embrace the crank case to which it is terminally connected.

2. A radius rod for motor operated vehicles including divergently disposed branches, adapted to be connected with the axle of the vehicle, a ball and socket connection between the opposed end of the rod and the crank case, said connection including a yieldable element serving as an anti-rattling device, and a yoke carried by the radius rod and adapted to be terminally connected with the crank case.

In testimony whereof I affix my signature.

HAROLD M. WESTHOLZ.